UNITED STATES PATENT OFFICE.

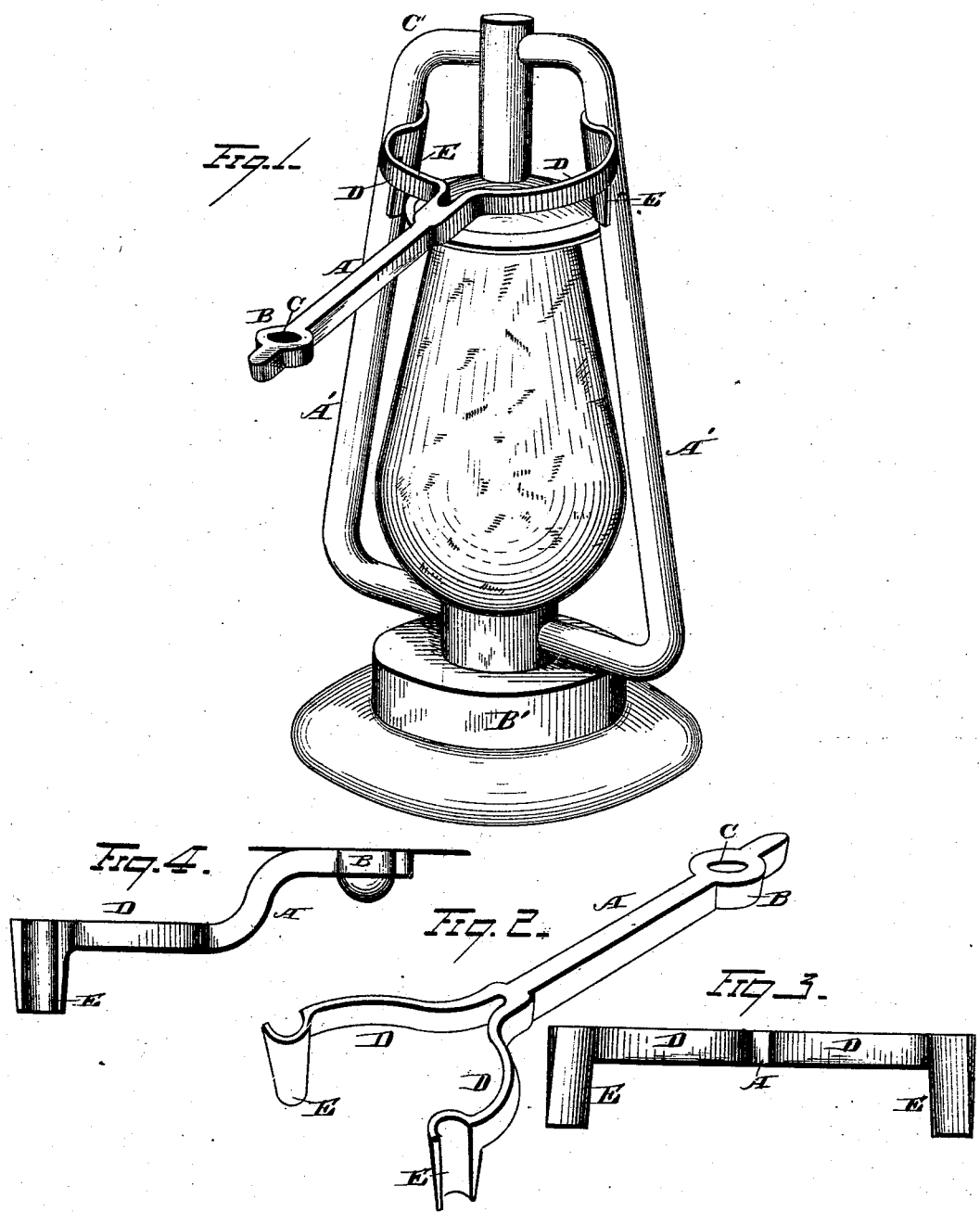

JOHN CHURCHILL, OF BRISTOL, CONNECTICUT.

LANTERN-HOLDER.

SPECIFICATION forming part of Letters Patent No. 235,994, dated December 28, 1880.

Application filed November 6, 1880. (Model.)

*To all whom it may concern:*

Be it known that I, JOHN CHURCHILL, of Bristol, in the county of Hartford and State of Connecticut, have invented certain new and useful Improvements in Lantern-Holders; and I do hereby declare the following to be a full, clear, and exact description of the invention, such as will enable others skilled in the art to which it pertains to make and use it, reference being had to the accompanying drawings, which form part of this specification.

My invention relates to an improvement in lantern-holders, the design and object whereof are to provide a simple, durable, and efficient device for the purpose indicated, and one that may be manufactured and supplied to the trade at a comparatively light cost.

With these ends in view, my invention consists, first, in a lantern-holder consisting of a shank one end whereof is adapted to be secured to the bottom of a vehicle, the other end being provided with two open arms the exterior faces of the outer ends of which are constructed to clasp the inner faces of the air-tubes of a tubular lantern.

My invention further consists in a lantern-holder consisting of a shank one end whereof is adapted to be secured to the bottom of a vehicle, the other end of said shank being provided with two open arms the exterior faces of the outer ends of which are provided with concave plates made integral therewith or attached thereto and adapted to engage with the convex inner faces of the air-tubes of a tubular lantern.

My invention further consists in certain other details of construction, as will be hereinafter set forth and described.

In the accompanying drawings, Figure 1 is a view, in perspective, showing my improved lantern-holder supporting a tubular lantern. Fig. 2 is view of a lantern-holder constructed in accordance with my invention. Fig. 3 is a front view thereof, and Fig. 4 is a view of a modified form of my improvement.

Let A represent the shank of the lantern-holder, one end of said shank being provided with an enlarged head, B, perforated at C, to permit of the pivotal adjustment of the lantern-holder to the bottom of a vehicle. The forward end of shank A is provided with two open arms, D, adapted to be engaged with the air-tubes of a tubular lantern by means of concave plates E, formed integral with or attached to the exterior faces of the outer ends of the said arms D. The lower ends of the concave plates E are slightly inclined outward to more perfectly engage with the air-tubes A' A' of the lantern B', which, as will be seen by reference to the drawings, are nearer together at the point of engagement with the lantern-holder than at the bottom of the lantern proper.

I have shown the lantern-holder as being formed of one piece of metal; but it is evident that it may be made in sections and joined together if found more desirable. For instance, the arms D may be formed separately and riveted or otherwise attached to the outer end of the shank A, and again the concave plates E may be formed integral with the arms D or attached thereto.

Having thus described the construction of my invention, I will now proceed to state the manner of its practical operation. Let us first suppose that the holder is attached to the bottom of a vehicle and at a distance from the edge thereof proportioned to the length of the shank A, and is turned under the said vehicle and out of view. When, now, it is desired to place the lantern in engagement with the holder it may be withdrawn from its concealed position by the hand and the lantern, previously filled, trimmed, and lighted, may be presented to it at a point where the air-tubes are sufficiently separated to admit the open arms D between them. The lantern is now pressed down, the air-tubes being guided by the concave plates E, until it is in the position shown in the drawings. The nature of this engagement is such that it is almost impossible to disturb the equilibrium of the lantern or disengage it from the holder without lifting it upwardly, thereby overcoming the frictional contact of the plates E on the air-tubes of the lantern, and the resilient pressure of the arms D constantly tending to force the plates E in wider separation. The leverage obtained by the plates E will hold the lantern firmly against lateral movement, while vertical movement is guarded against by the cross-tube C' in the one case, and the frictional contact and spring pressure of the plates in the other.

It is understood that the lantern, used as described, hangs at either of the sides, to the front, or to the rear of the vehicle-body; but by constructing the holder of the modified form, as shown in Fig. 4 of the drawings, the lantern may be swung back under the vehicle after it has been placed in attachment with the holder, which latter in any event is concealed beneath the vehicle when not in use.

I would have it understood that I do not limit myself to the exact form of construction shown and described, but hold myself at liberty to make such changes and alterations as fall within the spirit and scope of my invention.

Having fully described my invention, what I claim as new, and desire to secure by Letters Patent, is—

1. A lantern-holder consisting of a shank one end whereof is adapted to be secured to the bottom of a vehicle, the other end being provided with two open arms, the exterior faces of the outer ends of which are constructed to clasp the inner faces of the air-tubes of a tubular lantern, substantially as set forth.

2. A lantern-holder consisting of a shank one end whereof is adapted to be secured to the bottom of a vehicle, the other end of said shank being provided with two open arms, the exterior faces of the outer ends of which are provided with concave plates made integral therewith or attached thereto and adapted to engage with the convex inner faces of the air-tubes of a tubular lantern, substantially as set forth.

In testimony that I claim the foregoing, I have hereunto set my hand.

JOHN CHURCHILL.

Witnesses:
BENJ. F. HAWLEY,
ASAHEL BROCKETT.